United States Patent
Kimura

(10) Patent No.: US 9,134,126 B2
(45) Date of Patent: Sep. 15, 2015

(54) IMAGE PROCESSING DEVICE, AND IMAGE PROCESSING METHOD

(75) Inventor: Masayuki Kimura, Osaka (JP)

(73) Assignee: Dolby International AB, Amsterdam (NL)

( * ) Notice: Subject to any disclaimer, the term of this patent is extended or adjusted under 35 U.S.C. 154(b) by 644 days.

(21) Appl. No.: 13/390,536

(22) PCT Filed: Jun. 16, 2011

(86) PCT No.: PCT/JP2011/003437
§ 371 (c)(1),
(2), (4) Date: Feb. 15, 2012

(87) PCT Pub. No.: WO2011/158507
PCT Pub. Date: Dec. 22, 2011

(65) Prior Publication Data
US 2012/0140064 A1    Jun. 7, 2012

(30) Foreign Application Priority Data

Jun. 17, 2010 (JP) ................... 2010-138786

(51) Int. Cl.
*G01C 3/32* (2006.01)
*G06T 7/00* (2006.01)
(Continued)

(52) U.S. Cl.
CPC .. *G01C 3/32* (2013.01); *G02B 7/38* (2013.01); *G06T 7/0065* (2013.01); *G06T 7/0069* (2013.01); *H04N 7/18* (2013.01); *H04N 9/045* (2013.01); *G06T 2207/10148* (2013.01)

(58) Field of Classification Search
CPC ............ G06T 7/0069; G06T 7/0065; G06T 2207/10148; H04N 9/045; H04N 7/18
See application file for complete search history.

(56) References Cited

U.S. PATENT DOCUMENTS

| 5,381,236 A | 1/1995 | Morgan |
| 6,229,913 B1 | 5/2001 | Nayar et al. |

(Continued)

FOREIGN PATENT DOCUMENTS

| CN | 1434341 A | 8/2003 |
| CN | 1742294 A | 3/2006 |

(Continued)

OTHER PUBLICATIONS

International Search Report issued Aug. 30, 2011 in International (PCT) Application No. PCT/JP2011/003437.

(Continued)

*Primary Examiner* — Sath V Perungavoor
*Assistant Examiner* — Jill Sechser

(57) ABSTRACT

An image processing apparatus (10) includes: an imaging device (20); an optical system (22); and a distance determining unit (16) determining an object distance between the optical system and the object based on a size of a blur developed on the image. The optical system (22) has a characteristic which simultaneously satisfies both of conditions that (i) variation in magnification is equal to or smaller than the predetermined number of pixels in the case where a focused point is set farthest from and closest to the optical system (22) in a range of the distance of the object determined by the distance determining unit (16) and (ii) variation in a PSF due to an image height of the optical system (22) is equal to or smaller than a predetermined degree so as not to affect the determination of the distance of the object by the distance determining unit (16).

12 Claims, 5 Drawing Sheets

(51) Int. Cl.
*H04N 9/04* (2006.01)
*H04N 7/18* (2006.01)
*G02B 7/38* (2006.01)

(56) References Cited

U.S. PATENT DOCUMENTS

| | | | |
|---|---|---|---|
| 6,694,097 | B2 | 2/2004 | Tsunemiya et al. |
| 2003/0142969 | A1 | 7/2003 | Tsunemiya et al. |
| 2006/0072123 | A1 | 4/2006 | Wilson et al. |
| 2006/0119848 | A1 | 6/2006 | Wilson et al. |
| 2010/0118142 | A1* | 5/2010 | Ohsawa .................. 348/140 |
| 2011/0267507 | A1* | 11/2011 | Kane et al. .............. 348/241 |

FOREIGN PATENT DOCUMENTS

| | | |
|---|---|---|
| JP | 6-505096 | 6/1994 |
| JP | 2963990 | 10/1999 |
| JP | 3481631 | 12/2003 |
| JP | 2009-288042 | 12/2009 |
| JP | 2010-016743 | 1/2010 |
| WO | 92/14118 | 8/1992 |
| WO | 96/41304 | 12/1996 |

OTHER PUBLICATIONS

M. Subbarao et al., "Depth from Defocus: A spatial domain approach," International Journal of Computer Vision, vol. 13, No. 3, pp. 271-294, 1994.

First Office Action issued May 29, 2014 in corresponding Chinese patent application No. 201180003333.4 (with English translation).

* cited by examiner

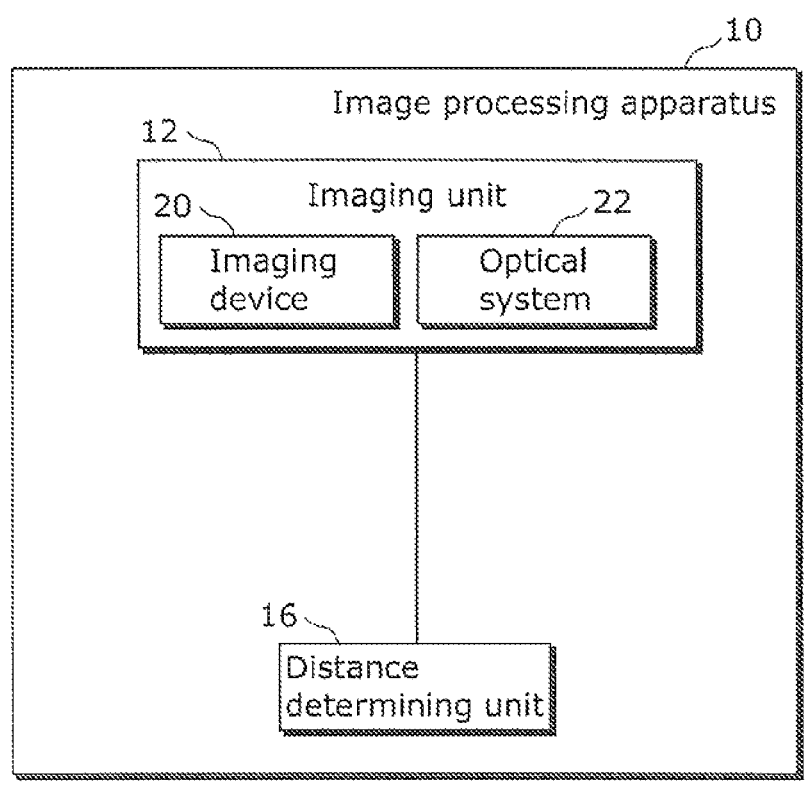

IMAGE PROCESSING DEVICE, AND IMAGE PROCESSING METHOD

TECHNICAL FIELD

The present invention relates to an image processing apparatus which determines the depth of a scene based on two or more images captured at a single view point.

BACKGROUND ART

In order to determine the depth of a three-dimensional scene with no physical contact to the objects; that is, to determine the distance to each of the objects, various techniques have been proposed. Such techniques are roughly classified into twofold: the active technique and the passive technique. The active technique involves irradiating the object with an infrared ray, an ultrasonic wave, and a laser to obtain the distance to the object based either on the time period in which the reflected wave bounces back or on the angle of the reflected wave. The passive technique involves obtaining the distance based on the image of the object. Particularly, in the case where a camera determines the distance to the object, the passive technique is widely used since no devices, such as an infrared emitter, are required.

The passive technique includes a variety of techniques, one of which is called the Depth from Defocus (hereinafter referred to as the DFD). The DFD is to determine distance based on a blur developed by the change of the focus. The features of the DFD are (i) only one camera is required, and (ii) the distance can be determined out of only a few images.

Briefly described hereinafter is how the DFD works.

If a captured image is I (x,y) and an original image with no lens blur is S (x,y), the relationship in an expression (1) holds therebetween:

[Math. 1]

$$I(x,y)=S(x,y)*h(x,y,d(x,y)) \quad (1)$$

Here, h denotes a Point Spread Function (PSF) representing a blur of the camera system, and d (x,y) denotes the distance (hereinafter, referred to as "distance of the object") from the principal point of the lens at a point (x,y) to the object. Moreover, "*" in the expressions represents a convolution operation.

The expression (1) includes S(x,y) and d(x,y) as unknowns. Captured here is an image $I_2$ (x,y) of the same scene with a shifted focused point. The shift of the focused point is the change of the PSF with respect to the same distance of the object. In other words, the following expression (2) holds:

[Math. 2]

$$I_2(x,y)=S(x,y)*h'(x,y,d(x,y)) \quad (2)$$

Here, h' denotes another PSF which has a focused point different from that of h. By solving the above expressions, the original image of the scene S(x,y) and the distance of the object d(x,y) are obtained. A variety of solutions have been proposed, including Non Patent Literature.

The problem here is that the change of a focused point in a regular camera system causes variation in magnification. The variation in the magnification shifts the position of the original image S(x,y) between the cases where the original image S(x,y) corresponds to the captured image the captured image I(x,y) and where the original image S(x,y) corresponds to the captured image $I_2$(x,y). Such a variation prevents the accurate determination of the distance. In order to solve the above problem, Patent Literatures 1 and 2 disclose techniques to utilize telecentric optical systems.

CITATION LIST

Patent Literature

[PTL 1]
  Japanese Patent No. 2963990
[PTL 2]
  Japanese Patent No. 3481631

Non Patent Literature

[NPL]
  "Depth from Defocus: a spatial domain approach", M. Subbarao, G. Surya, International Journal of Computer Vision, Vol. 13, No. 3, pp. 271-294, 1994

SUMMARY OF INVENTION

Technical Problem

The techniques in Patent Literatures 1 and 2 face two major problems.

The first problem is that the necessity of the telecentric optical system imposes a significant optical restriction, which decreases the flexibility in designing a lens.

The second problem is about blur uniformity. In the case where on-axis image and off-axis image have significantly different blurs; that is the PSFs are significantly different with each other, a single PSF cannot be applied to the entire image in using each of DFD algorithms. Such a problem makes the distance calculation complex. Thus, desirably, the blur would be developed uniformly on the entire image. The telecentric optical system, however, does not necessarily assure such a uniformed blur.

The present invention is conceived in view of the above problems and has as an object to provide an image processing apparatus including an optical system whose variation in magnification is sufficiently small and which is capable of capturing an image having a uniform blur on the entire image, and an image processing method performed by the apparatus.

Solution to Problem

An image processing apparatus according to an aspect of the present invention includes: an imaging device which captures an image; an optical system which causes the imaging device to form an image of an object; and a distance determining unit which determines distance of the object between the optical system and the object based on a size of a blur developed on the image, wherein the optical system has a characteristic which simultaneously satisfies both of conditions that (i) variation in magnification is equal to or smaller than the predetermined number of pixels in the case where a focused point is set farthest from and closest to the optical system in a range of the distance of the object determined by the distance determining unit and (ii) variation in a Point Spread Function due to an image height of the optical system is equal to or smaller than a predetermined degree so as not to affect the determination of the distance of the object by the distance determining unit.

Thanks to such a structure, the characteristics of the optical system are limited to the degree not to substantially affect the distance determination. Hence, the image processing apparatus ensures uniform accuracy in an entire image, eliminating the need for changing processing for each part of the image in the distance determination.

In the case where the focused point in the optical system is moved by the shift of the imaging device, the angle of incidence 9 of a chief ray traveling into the imaging device in the optical system may satisfy the following expression (3):

[Math. 3]

$$|\theta| < \tan^{-1}\left(\frac{1}{FB\min D}\left(1 - \frac{f}{u_{min}}\right)\right). \tag{3}$$

Here, F denotes an F-number of said optical system, f denotes a focal length of said optical system, minD denotes the number of pixels indicating a smallest size of a determinable blur by said distance determining unit, B denotes the number of stages to be determined by the distance determining unit, and $u_{min}$ denotes distance closest to the optical system in the range of the distance of the object determined by the distance determining unit.

Such a feature ensures that the variation in magnification developed by the shifting focus becomes smaller than a determinable degree in the distance determination processing. In other words, the same set of coordinates on two or more captured images having different focused points correspond to a single set of coordinates on an original image S (x,y).

Here, in the case where a lens included in the optical system is shifted for shifting the focused point of the optical system, a difference δy, between (i) a size of an image in the imaging device when the focused point is set closest to the optical system and (ii) a size of the image in the imaging device when the focused point is set farthest from the optical system, may satisfy the following expression (4) in the range of the distance of the object determined by the distance determining unit:

[Math. 4]

$$|\delta y| < d \tag{4}$$

Here, d is the size of a pixel in the imaging device. Such a feature ensures that the variation in magnification developed by the shifting focus becomes smaller than a determinable degree in the distance determination. In other words, the same set of coordinates on two or more captured images having different focused points correspond to a single set of coordinates on an original image S (x,y).

In the optical system, an amount of field curvature δq in each of image heights may satisfy the following expression (5):

[Math. 5]

$$|\delta q| < \frac{u_{max}}{u_{max} - f} F d \min D. \tag{5}$$

Here, F denotes an F-number of the optical system, f denotes a focal length of the optical system, minD denotes the number of pixels indicating a smallest size of a determinable blur by the distance determining unit, $u_{max}$ denotes distance farthest from the optical system in the range of the distance of the object determined by the distance determining unit, and d denotes a size of one pixel in the imaging device.

Such a feature ensures that the amount of an off-axis blur developed by the field curvature becomes smaller than a determinable degree in the distance determination. Hence, the sizes of blurs are approximately the same for the same distance of the object, which contributes to reducing an error in the distance determination.

Here, in the optical system, an amount of field curvature in a sagittal direction δqs and an amount of the field curvature in a tangential direction δqt in each of image heights respectively may satisfy the following expressions (6) and (7):

[Math. 6]

$$|\delta qs| < \frac{u_{max}}{u_{max} - f} F d \min D \tag{6}$$

$$|\delta qt| < \frac{u_{max}}{u_{max} - f} F d \min D. \tag{7}$$

Here, F denotes an F-number of the optical system, f denotes a focal length of the optical system, minD denotes the number of pixels indicating a smallest size of a determinable blur by the distance determining unit, $u_{max}$ denotes distance farthest from the optical system in the range of the distance of the object determined by the distance determining unit, and d denotes a size of one pixel in the imaging device.

Such a feature ensures that the amount of an off-axis blur developed by the astigmatic difference becomes smaller than a determinable degree in the distance determination. This makes the shape of the blur uniform on the entire image, which contributes to reducing an error in the distance determination via the application of a single PSF to the entire image.

In the optical system, an amount of coma aberration δc in each of image heights may satisfy the following expression (8):

[Math. 7]

$$|\delta c| < d \min D \tag{8}$$

Here, minD denotes the number of pixels indicating a smallest size of a determinable blur by the distance determining unit, and d denotes a size of one pixel in the imaging device.

Such a feature ensures that the amount of an off-axis blur developed by the coma aberration becomes smaller than a determinable degree in the distance determination. This makes the shape of the blur uniform on the entire image, which contributes to reducing an error in the distance determination via the application of a single PSF to the entire image.

Advantageous Effects of Invention

An image processing apparatus of the present invention maintains the variation in magnification and ununiformity of on-axis and off-axis blurs at a level which develops no effect on the image processing for distance determination. Thus, the image processing apparatus does not develop an error due to the performance of a lens even though the adjustment in magnification is not taken into consideration in image processing and uniform processing is provided to the entire image.

BRIEF DESCRIPTION OF DRAWINGS

FIG. 9 shows a minimal structure of the image processing apparatus of the present invention.

DESCRIPTION OF EMBODIMENT

Embodiment

Figure 1:
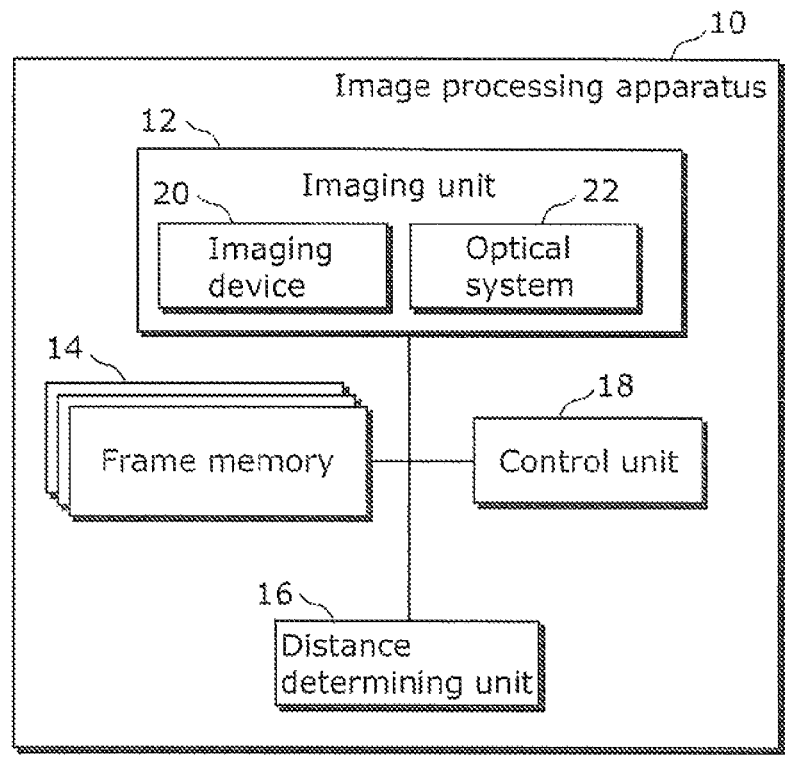
FIG. 1 shows a structure of an image processing apparatus according to the embodiment of the present invention.

Described hereinafter is an embodiment of the present invention with reference to the drawings. FIG. 1 depicts a block diagram to show a functional structure of an image processing apparatus according to the embodiment of the present invention.

An image processing apparatus 10 includes an imaging unit 12, a frame memory 14, a distance determining unit 16, and a control unit 18.

The imaging unit 12 captures an image of an object, and provides the captured image. The imaging unit 12 includes an imaging device 20, and an optical system 22 which is used for causing the imaging device 20 to form the object image. A Charge Coupled Device (CCD) sensor and a Complementary Metal Oxide Semiconductor (CMOS) sensor may be used as the imaging device 20.

Used for storing images on a frame basis, the frame memory 14 stores images provided from the imaging unit 12.

The distance determining unit 16 determines the distance of the object based on the image captured by the imaging unit 12. Distance determination techniques may include known and typically used DFD algorithms, such as the technique disclosed in Non Patent Literature.

Including a Read Only Memory (ROM) and a Random Access Memory (RAM), which store a control program, and a CPU, the control unit 18 controls each of the functional blocks included in the image processing apparatus 10.

Described next in order are the performance requirements that the optical system 22 needs to satisfy.

(Variation in Magnification)

Figure 2A:
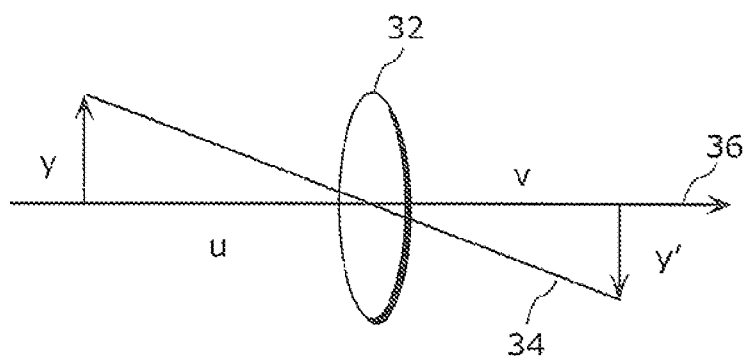
FIG. 2A schematically shows how a lens forms an image.

FIG. 2A schematically shows how a lens forms an image. According to the Gaussian lens law, the relationship shown in the following expression (9) holds between (i) the distance u from the principal point (hereinafter referred to as "principal point") of a lens 32 to the object and (ii) the distance v from the principal point to the image plane:

[Math. 8]

$$\frac{1}{f} = \frac{1}{u} + \frac{1}{v}. \tag{9}$$

Figure 2B:
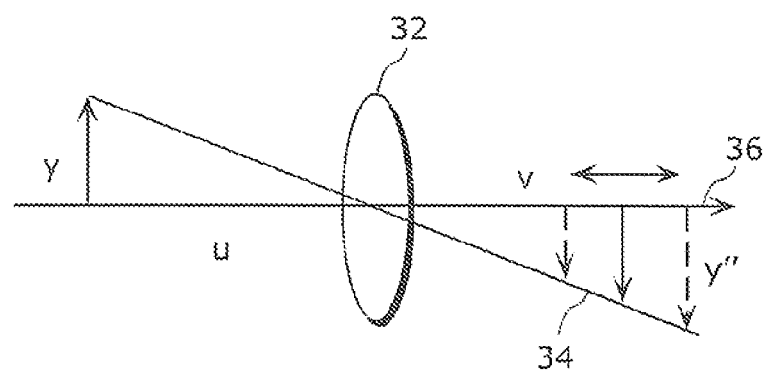
FIG. 2B schematically shows how magnification varies as an image plane shifts.

Here, f denotes the focal length of the lens 32. The size of an object is y, and the size of the object image is y'. The expression (9) shows that if the distance u between the principal point and the object changes when the focal length f stays constant, the distance v between the principal point and the image plane also changes. The change in the distance v also causes a change in the size of the image y'', as shown in FIG. 2B. This is because a chief ray 34, passing through the center of the opening, is inclined relative to an axis 36 and enters into the image plane. Detailed moreover is the relationship between the angle of incidence of the chief ray 34 and the variation in the image size.

Figure 3:
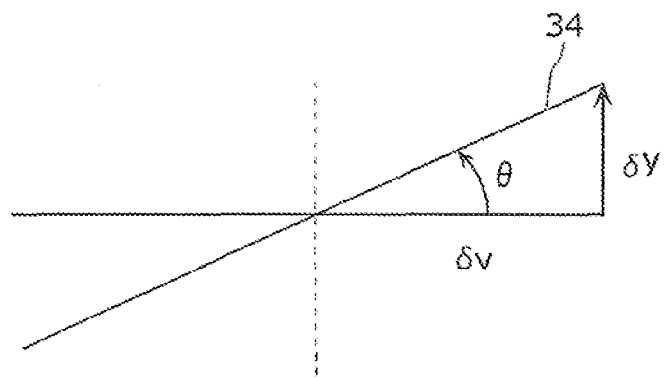
FIG. 3 schematically shows a relationship between the traveling distance of the image and the variation in the magnification.

In the range of the distance of the object determined by the distance determining unit 16, as shown in FIG. 3, if the variation in the distance v between the principal point and the image plane is δv and the angle of incidence of the chief ray 34 is θ when the focused point is set to the closest position and the farthest position to and from the optical system 22, the variation δy of the image size y at the above. reference positions is obtained by the following expression 10):

[Math.9]

$$\delta y = \delta v \tan \theta \tag{10}$$

Here, if the absolute value of the δy is smaller than the size of one pixel of an imaging device d, it is assumed that the size of the image does not change substantially. In other words, if the change of the distance v between the principal point and the image plane does not affect the size of the image, the following expression (11) needs to be satisfied:

[Math.10]

$$d > \delta v \tan |\theta| \tag{11}$$

Figure 4:
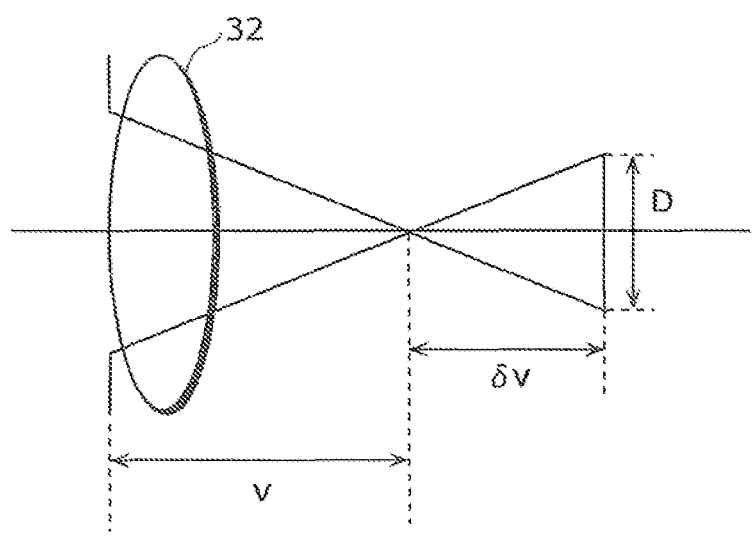
FIG. 4 schematically shows a relationship between the position of the image plane and the size of a blur circle.

In order to satisfy the expression (11), at least one of δv and θ needs to be small. For the determination of the distance using the DFD, however, the blur needs to be changed as the focus changes. Thus, δv cannot be made excessively small. Described hereinafter is the relationship between δv and the size of the blur with reference to FIG. 4.

Here, f is the focal length of the lens 32, and u is the distance between the principal point and the object. The image plane is positioned δv away from the focal point. If the effect by diffraction is ignored, the following expression (12) expresses the diameter D of a blur circle showing the size of a blur developed here:

[Math. 11]

$$D = \frac{\delta v}{F}\left(1 - \frac{f}{u}\right). \tag{12}$$

Here, F denotes the F-number of the optical system 22. The value of δv is determined in order to make the diameter D large enough to determine the distance by the DFD. In a DFD algorithm, if a smallest size of a determinable blur is a minD pixel, and distance determination in a B-stage (distance determination when the distance is expressed in the number of stages B) is sufficient, D may satisfy the following expression (13):

[Math. 12]

$$D > dB \text{min} D \tag{13}$$

According to the expressions (12) and (13), δv needs to satisfy the expression (14) in order to obtain a large enough blur for the DFD.

[Math. 13]

$$\delta v > \frac{u}{u-f} dF B \text{min} D. \tag{14}$$

In order to make the variation in the image size small and obtain the large enough blur for the DFD by the expressions (11) and (14), the angle of the incidence θ of the chief ray 34 needs to satisfy the condition expressed by the expression (15) below. Thus, the optical system 22 may be designed such that the expression (15) is satisfied.

[Math. 14]

$$|\theta| < \tan^{-1}\left(\frac{1}{F B \min D}\left(1 - \frac{f}{u}\right)\right). \quad (15)$$

The expression (15) shows that a smaller u makes the value of the right side smaller. Thus, if the shortest distance to the optical system 22 is $u_{min}$ in the range of the distance of the object determined by the DFD, the substantial upper limit of θ is the value of the left side when $u=u_{min}$ is satisfied in the expression (15).

The embodiment assumes the case where the focused point in the optical system 22 is moved by the shift of the imaging device 20. Instead, the focused point may be changed by the shift of the lens included in the optical system 22.

Suppose y' denotes the size of the image in the imaging device 20 before the focused point changes (in the case where the focused point is set closest to the optical system 22 in the range of the distance of the object determined by the distance determining unit 16), and y" denotes the size of the image in the imaging device 20 after the focused point changes (in the case where the focused point is set farthest from the optical system 22 in the range of the distance of the object determined by the distance determining unit 16). If the absolute value of the difference δy between the sizes is smaller than the size d of one pixel in the imaging device, it is considered that there is no substantial change in the size of the image. Thus, the following expression (16) needs to be satisfied:

[Math. 15]

$$|\delta y| < d \quad (16)$$

It is noted that the blur obtained here needs to be large enough for the DFD, as described above, since the lens included in the optical system shifts. Thus, if the object in the distance of the object u is focused before the change of the focus, the size D of the blur, made by the light from the same object after the change of the focus, needs to satisfy the expression (13).

(Off-Axis Aberrations: Field Curvature)

Desirably, for the DFD, the blur would be developed uniformly on the entire image as described before. Among the five Seidel aberrations, three of the five aberrations; namely the field curvature in FIG. 5A, the astigmatism in FIG. 5B, and the coma aberration in FIG. 5C, affect the blur uniformity. Described hereinafter are acceptable amounts of the aberrations.

Figure 5A:
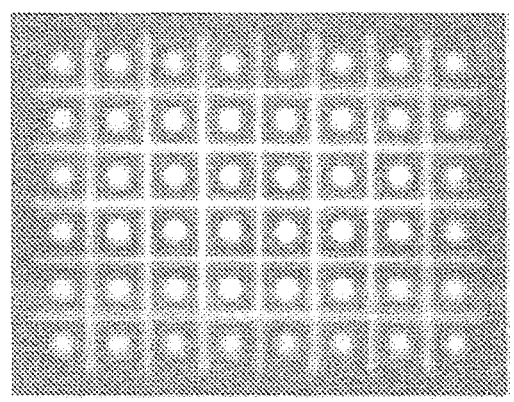
FIG. 5A schematically shows field curvature.

Detailed first is the field curvature shown in FIG. 5A. The field curvature is an aberration in which focused focal points of off-axis rays, including the focused focal point of the on-axis ray, do not appear on a plane perpendicular to the optical axis; instead, the focused focal points appear forward and backward in the direction of the optical axis. When the distance is determined by the DFD on the assumption that the blur occurs uniformly on the entire image, the blur of the object actually found in a single distance appears in different sizes depending on a ray angle. Thus, the distance to the object is inevitably determined such that the object is located in different distances. Detailed hereinafter is an acceptable amount of the field curvature.

Figure 6:
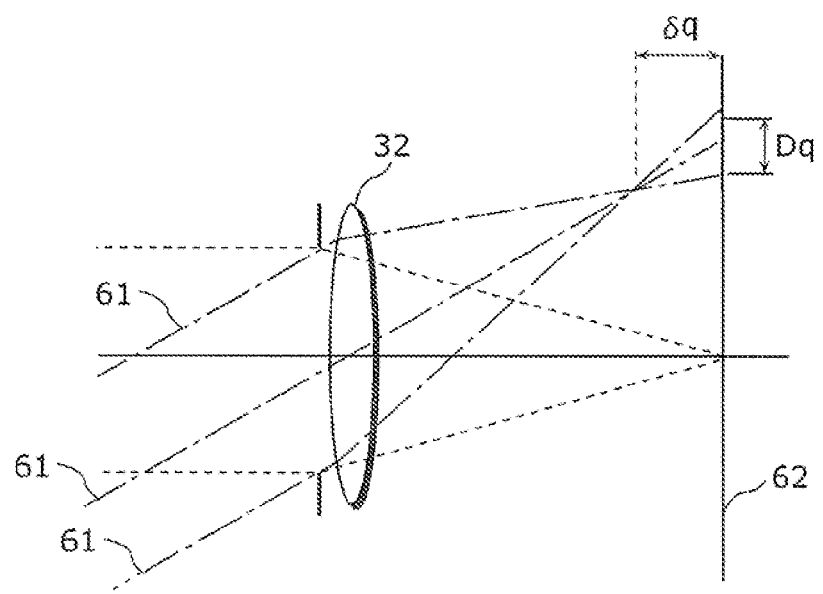
FIG. 6 schematically shows a relationship between the amount of the field curvature and the size of the blur circle.

As shown in FIG. 6, δq is the amount of field curvature developed by a ray 61 having a certain ray angle. It is noted that δq is positive when δq changes from the object toward the image plane 62. If f is the focal length of the lens 32, u is the distance between the principal point and object, and the effect by diffraction is ignored, the following expression (17) expresses the diameter $D_q$ of a blur circle with respect to the ray angle:

[Math. 16]

$$D_q = \frac{|\delta q|}{F}\left(1 - \frac{f}{u}\right). \quad (17)$$

Here, F denotes the F-number of the optical system 22. If $D_q$ is smaller than d*minD; that is the smallest size of a determinable blur in the DFD algorithm, the effect of the field curvature may be ignored. In order to satisfy the above condition, the amount of field curvature in each of image heights needs to satisfy the expression (18) below. Thus, the optical system 22 may be designed to satisfy the expression (18):

[Math. 17]

$$|\delta q| < \frac{u}{u - f} F d \min D. \quad (18)$$

The expression (18) shows that a larger u makes the value of the right side smaller. Hence, if $u_{max}$ is the distance farthest from the optical system 22 in the distance range in which the distance is determined by the DFD, the value of δq is the virtual upper limit of δq if $u=u_{max}$ is satisfied.

(Off-Axis Aberrations: Astigmatism)

Figure 5B:
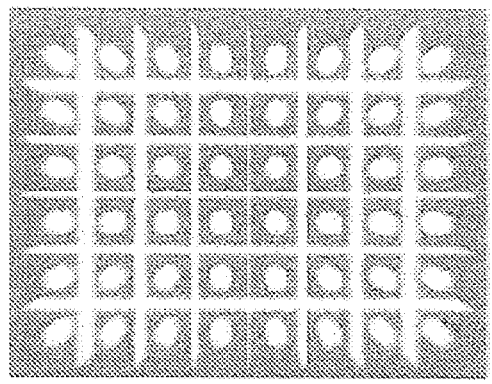
FIG. 5B schematically shows astigmatism.

Described next is the astigmatism shown in FIG. 5B. The astigmatism is an aberration in which different focal points are observed in luminous flux directed toward a concentric direction (sagittal direction) and in luminous flux directed toward a radial direction (tangential direction). If the astigmatism occurs, the off-axis blur is not formed in a regular circle but formed in a vertically- or horizontally-long oval. This problem develops an ununiformly-shaped blur on the entire image.

The amount of astigmatism is defined as the field curvature; that is, the distance between (i) a plane including focused focal points in each of the sagittal direction and the tangential direction, and set perpendicular to the optical axis and (ii) a plane including the focused focal point of the on-axis ray, and set perpendicular to the optical axis. Thus, if δqs is the amount of field curvature in the sagittal direction for each of the image heights and δqt is the amount of the field curvature in the tangential direction, the optical system 22 may be designed so that δqs and δqt satisfy the expression (18) instead of δq. Accordingly, the effect of the astigmatism can be virtually ignored. In other words, the optical system 22 may be designed to satisfy the expressions (19) and (20):

[Math. 18]

$$|\delta qs| < \frac{u_{max}}{u_{max} - f} F d \min D \quad (19)$$

$$|\delta qt| < \frac{u_{max}}{u_{max} - f} F d \min D. \quad (20)$$

The expression (19) shows that a larger u makes the value of the right side smaller. Hence, if $u_{max}$ is the distance farthest from the optical system 22 in the distance range in which the distance is determined by the DFD, the value of δqs is the virtual upper limit of δqs if $u=u_{max}$ is satisfied. Similarly, in the expression (20), the value of δqt is the virtual upper limit of δqt if $u=u_{max}$ is satisfied.

(Off-Axis Aberrations: Coma Aberration)

Figure 5C:
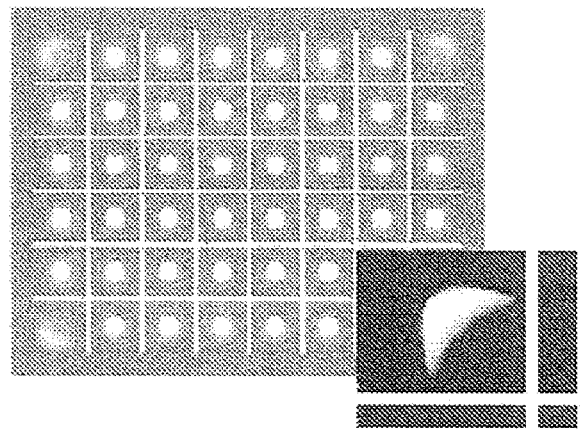
FIG. 5C schematically shows coma aberration.

Finally described is the coma aberration shown in FIG. 5C. In the coma aberration, there is variation in an image formed of a chief ray of an off-axis ray and a ray outside. The development of the coma aberration prevents the blur from uniformly forming off-axis, and causes the blur to appear tailing. This problem also develops an ununiformly-shaped blur on the entire image. Detailed hereinafter is an acceptable amount of the coma aberration.

Figure 7:
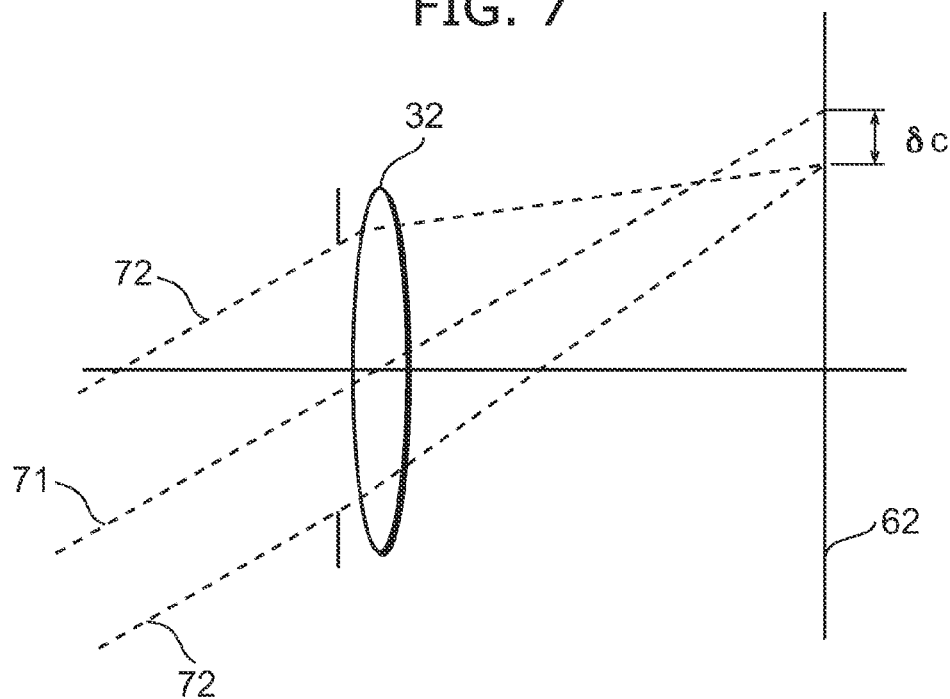
FIG. 7 schematically shows the size of the coma aberration.

Here, the position of the object is at infinity. As shown in FIG. 7, the amount of coma aberration δc is defined as the difference between the size of an image formed of a chief ray 71 traveling through the center of the opening and the size of an image formed of rays 72 traveling through outermost parts of the opening. Here, δc is positive when the image becomes larger. Thus, if δc for each of the image heights is smaller than d*minD; that is the smallest size of the determinable blur in the DFD algorithm, the effect of the field curvature may be ignored. To achieve this, the expression (21) below needs to be satisfied. Thus, the Optical system 22 may be designed to satisfy the expression (21):

[Math. 19]

$$|\delta c| < d \min D \quad (21)$$

It is noted that each of the conditions described above is applied in the case where a single lens is used; however, the structure of the optical system 22 according to the embodiment of the present invention shall not be limited to the single lens. Here, each condition is determined by the focal length and the F-number of the whole optical system 22 respectively used as the above-described focal length and F-number.

It is noted that the upper limits are set for the magnification variation and the field curvature based on a finite distance of the object; meanwhile, for the sake of simplicity in calculation, the magnification variation and the field curvature may be calculated based on infinite distance to the object.

(Example Based on Specific Figures)

Figure 8:
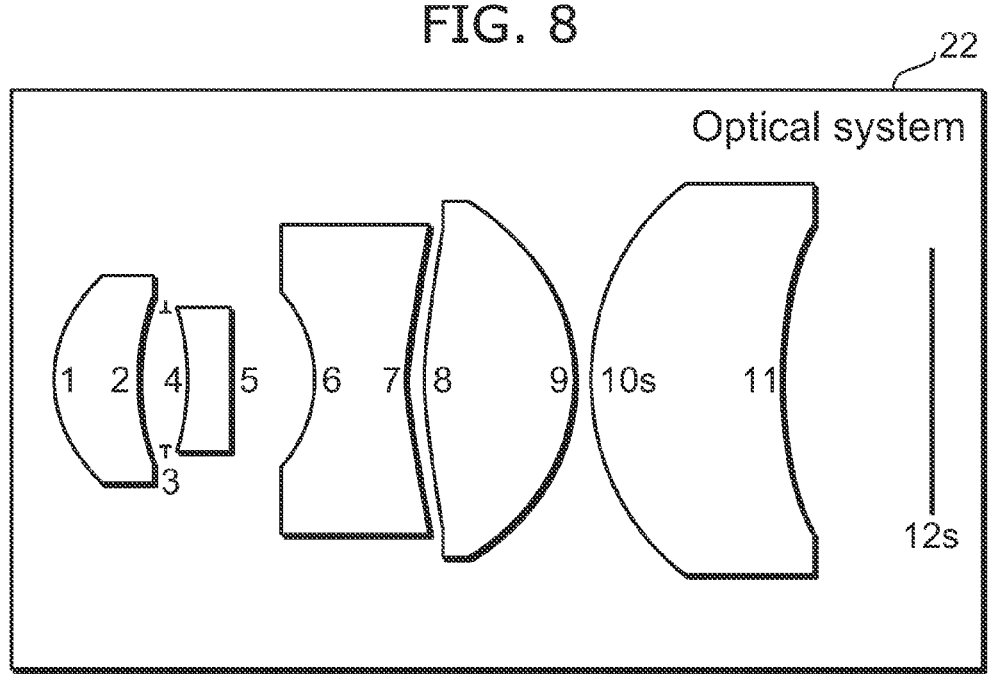
FIG. 8 shows shapes of optical lenses according to the embodiment.

Shown in Table 1 and in FIG. 8 are an example based on specific figures and the shapes of the optical system 22 according to the embodiment. It is noted that R, d, nd, and vd are respectively the radius of curvature (millimeters) of each surface of lenses, the d-spacing (millimeters), the refractive index of d ray, and the Abbe number. Moreover, * in a surface number shows that the lens is aspheric. FIG. 8 numerically shows the sphere numbers. An aspheric shape is expressed by the following expression (22):

[Math. 20]

$$Z = \frac{cr^2}{1+\sqrt{1-(1+k)c^2 r^2}} + A_4 r^4 + A_6 r^6 + A_8 r^8 + A_{10} r^{10} + A_{12} r^{12}. \quad (22)$$

Here, c is 1/R, k is a constant of the cone, and A4, A6, A8, A10, and A12 are respectively the fourth-, sixth-, eighth-, tenth-, and twelfth-order asphericities.

TABLE 1

| Surface Number | R | d | nd | vd |
|---|---|---|---|---|
| 1* | 4.30 | 2.55 | 1.531 | 56.04 |
| 2 | 9.08 | 0.75 | | |
| 3(Diaphragm Plane) | | 0.70 | | |
| 4* | −8.75 | 1.39 | 1.585 | 29.91 |
| 5* | −15.13 | 2.40 | | |
| 6* | −5.59 | 2.90 | 1.585 | 29.91 |
| 7* | 6.39 | 0.50 | | |
| 8* | 12.11 | 4.66 | 1.531 | 56.04 |
| 9* | −5.56 | 0.50 | | |
| 10s | 7.91 | 5.86 | 1.531 | 56.04 |
| 11* | 13.00 | 4.61 | | |
| 12s(Image Plane) | | — | | |

Moreover, Table 2 shows the constant of the cone k of each aspheric and the asphericities $A_4$, $A_6$, $A_8$, $A_{10}$, and $A_{12}$. The sphere numbers in Table 2 correspond to those in Table 1.

TABLE 2

| Surface Number | Constant of Core | Asphericity |
|---|---|---|
| 1* | k = 0.25 | $A_4 = -2.92023e^{-4}$<br>$A_6 = 8.88165e^{-5}$<br>$A_8 = -1.79531e^{-5}$<br>$A_{10} = 1.47067e^{-6}$<br>$A_{12} = -4.02014e^{-8}$ |
| 4* | k = 3.50 | $A_4 = -1.03975e^{-3}$<br>$A_6 = 2.36037e^{-4}$<br>$A_8 = -8.56895e^{-6}$<br>$A_{10} = -1.82407e^{-7}$<br>$A_{12} = -4.49751e^{-8}$ |
| 5* | k = −10.00 | $A_4 = -6.85554e^{-4}$<br>$A_6 = 9.60862e^{-4}$<br>$A_8 = -1.29048e^{-4}$<br>$A_{10} = 1.00013e^{-5}$<br>$A_{12} = 8.08464e^{-7}$ |
| 6* | k = 0 | $A_4 = -6.70814e^{-3}$<br>$A_6 = 4.88316e^{-4}$<br>$A_8 = -7.77593e^{-6}$<br>$A_{10} = -2.24758e^{-6}$<br>$A_{12} = 1.49276e^{-7}$ |
| 7* | k = −11.00 | $A_4 = -1.77854e^{-3}$<br>$A_6 = 1.43745e^{-4}$<br>$A_8 = -5.67046e^{-6}$<br>$A_{10} = 8.24148e^{-8}$<br>$A_{12} = -3.56072e^{-10}$ |
| 8* | k = 0 | $A_4 = -1.50234e^{-3}$<br>$A_6 = 6.29817e^{-5}$<br>$A_8 = -1.73445e^{-6}$<br>$A_{10} = 1.63316e^{-8}$<br>$A_{12} = -1.13763e^{-10}$ |
| 9* | k = −0.24 | $A_4 = 5.40623e^{-4}$<br>$A_6 = -6.24787e^{-6}$<br>$A_8 = 2.86991e^{-7}$<br>$A_{10} = -1.11977e^{-8}$<br>$A_{12} = 3.07953e^{-10}$ |
| 11* | k = 0 | $A_4 = -6.04112e^{-4}$<br>$A_6 = 5.22644e^{-5}$<br>$A_8 = -9.52175e^{-7}$<br>$A_{10} = 1.01401e^{-8}$<br>$A_{12} = -2.34088e^{-11}$ |

Here, the focal length is 15.78 mm, the f-number is 2.8, and the half angle of view is 14.97°. Furthermore, the parameters of the DFD are determined as follows: The size of a pixel d for an imaging device is 2.4 μm, the smallest size of a determinable blur; namely the minD, in the DFD algorithm is two pixels, the number of stages B for determining the depth is 16-level color gradation, and the distance to object to be determined is between one meter and 10 meter. In other words, $u_{min}$ is 1 meter and $u_{max}$ is 10 meters. Here, according to the expressions (15), (18), and (21), |θ|<0.629°, |δq|<13.46 μm, and |δc|<4.80 μm need to be satisfied where θ is the angle of incidence of the chief ray, δq is the amount of field curvature, and δc is the amount of coma aberration.

Table 3 shows the angles of incidence of a chief ray θF, θd, and θc (degree) at each of the image heights with respect to F line, d line, and C line in the optical system 22.

TABLE 3

| Image Height | θF | θd | θC |
|---|---|---|---|
| 10% | 0.111 | 0.126 | 0.133 |
| 20% | 0.209 | 0.238 | 0.253 |
| 30% | 0.280 | 0.324 | 0.345 |
| 40% | 0.314 | 0.373 | 0.401 |
| 50% | 0.309 | 0.383 | 0.419 |
| 60% | 0.268 | 0.360 | 0.403 |
| 70% | 0.200 | 0.312 | 0.365 |
| 80% | 0.102 | 0.240 | 0.304 |
| 90% | 0.072 | 0.102 | 0.183 |
| 100% | 0.470 | 0.234 | 0.128 |

Table 4 shows the amounts of field curvature in the sagittal direction; namely δqsF, δqsd, and δqsC, and the amounts of field curvature in the tangential direction; namely δqtF, δqtd, and δqtC, with respect to the F line, the d line and the C line in the optical system 22 in Table 1. It is noted that each amount of the field curvature here shows variation from on-axis image plane position in each wave length. The amount is measured in μm.

TABLE 4

| Image Height | δqsF | δqtF | δqsd | δqtd | δqsC | δqtC |
|---|---|---|---|---|---|---|
| 10% | −0.268 | −1.942 | 0.046 | −1.165 | 0.178 | −0.832 |
| 20% | −0.810 | −6.270 | 0.387 | −3.482 | 0.892 | −2.287 |
| 30% | −1.095 | −9.532 | 1.398 | −4.297 | 2.450 | −2.042 |
| 40% | −0.837 | −10.042 | 3.166 | −2.833 | 4.853 | 0.283 |
| 50% | −0.274 | −8.792 | 5.262 | −0.837 | 7.588 | 2.595 |
| 60% | 0.000 | −7.286 | 6.935 | −0.340 | 9.830 | 2.622 |
| 70% | −0.605 | −5.407 | 7.490 | −1.420 | 10.835 | 0.208 |
| 80% | −2.480 | −1.744 | 6.504 | −2.224 | 10.166 | −2.561 |
| 90% | −0.600 | 4.055 | 3.695 | −0.674 | 7.587 | −2.764 |
| 100% | −12.529 | 1.219 | −1.909 | −2.125 | 2.309 | −3.355 |

Table 5 shows the amounts of coma aberration; namely δcF, δcd, and δcC (μm), with respect to the F line, the d line and the C line in the optical system 22 in Table 1.

TABLE 5

| Image Height | δcF | δcd | δcC |
|---|---|---|---|
| 10% | 0.561 | 0.922 | 1.456 |
| 20% | −0.022 | 0.796 | 1.905 |
| 30% | −1.676 | −0.266 | 1.480 |
| 40% | −3.136 | −1.037 | 1.397 |
| 50% | −3.284 | −0.501 | 2.635 |
| 60% | −2.627 | 0.670 | 4.459 |
| 70% | −3.169 | 0.092 | 4.343 |
| 80% | −3.941 | −2.413 | 1.480 |
| 90% | 1.719 | −1.028 | 1.949 |
| 100% | −1.079 | −1.799 | 2.378 |

The designated conditions are satisfied to any given image height and wavelength. Thus, variation in magnification and ununiformity of on-axis and off-axis blurs are maintained at a level which develops no effect on the image processing for distance determination. Thus, the image processing apparatus according to the embodiment does not develop an error caused by the performance of a lens even though the adjustment in magnification is not taken into consideration in image processing and uniform processing is provided to the entire image.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

It is noted that FIG. 9 shows a minimum structure of the image processing apparatus for the present invention. The image processing apparatus 10 may include the imaging unit 12 and the distance determining unit 16.

In addition, the present invention may be provided as a method including the processing executed by a distance determining unit in the above image processing apparatus.

Moreover, the present invention may be provided as an integrated circuit which has the distance determining unit in the image processing apparatus integrated.

Furthermore, the present invention may be provided as a program which causes a computer to execute the processing carried out by the distance determining unit in the image processing apparatus.

INDUSTRIAL APPLICABILITY

The present invention is capable of determining distance based on two or more images captured at a single view point, and thus is applicable to imaging appliances in general. In particular, the present invention is suitable to the uses that require to have high accuracy in distance-determination and to keep processing amount low since the entire image is characterized in having a uniform blur and the processing does not have to be changed for each part of the image.

REFERENCE SIGNS LIST

10. Image processing apparatus
12. Imaging unit
14. Frame memory
16. Distance determining unit
18. Control unit
20. Imaging device
22. Optical system

The invention claimed is:

1. An image processing apparatus comprising: an imaging device which captures an image; an optical system which causes said imaging device to form an image of an object; and a distance determining unit configured to determine distance of the object between said optical system and the object based on a size of a blur developed on the image, wherein said optical system has a characteristic which simultaneously satisfies both of conditions that (i) variation in magnification is equal to or smaller than the predetermined number of pixels in the case where a focused point is set farthest from and closest to said optical system in a range of the distance of the object determined by said distance determining unit and (ii) variation in a Point Spread Function due to an image height of said optical system is equal to or smaller than a predetermined degree so as not to affect the determination of the distance of the object by said distance determining unit; and wherein the range of the distance is determined based on a same set of coordinates of the image at different focus points.

2. The apparatus according to claim 1, wherein the predetermined number of pixels comprises the smallest size of a determinable blur at the distance of the object.

3. The apparatus according to claim 1, wherein an amount of off-axis blur developed by a field curvature is smaller than a determinable degree in the distance determination.

4. The apparatus according to claim 1, wherein an amount of field curvature in a sagittal direction and an amount of the field curvature in a tangential direction at each focus is less than a predetermined threshold.

5. An image processing apparatus, comprising:
an imaging device which captures an image; an optical system which causes said imaging device to form an image of an object; and a distance determining unit configured to determine distance of the object between said optical system and the object based on a size of a blur developed on the image, wherein said optical system has a characteristic which simultaneously satisfies both of conditions that (i) variation in magnification is equal to or smaller than the predetermined number of pixels in the case where a focused point is set farthest from and closest to said optical system in a range of the distance of the object determined by said distance determining unit and (ii) variation in a Point Spread Function due to an image height of said optical system is equal to or smaller than a predetermined degree so as not to affect the determination of the distance of the object by said distance determining unit;
wherein, in the case where the focused point of said optical system is shifted, a difference δy, between (i) a size of an image in said imaging device when the focused point is set closest to said optical system and (ii) a size of the image in said imaging device when the focused point is set farthest from said optical system, satisfies Expression (1) in the range of the distance of the object determined by said distance determining unit where d denotes a size of one pixel in said imaging device: |δy|<d (1).

6. An image processing apparatus, comprising:
an imaging device which captures an image; an optical system which causes said imaging device to form an image of an object; and a distance determining unit configured to determine distance of the object between said optical system and the object based on a size of a blur developed on the image, wherein said optical system has a characteristic which simultaneously satisfies both of conditions that (i) variation in magnification is equal to or smaller than the predetermined number of pixels in the case where a focused point is set farthest from and closest to said optical system in a range of the distance of the object determined by said distance determining unit and (ii) variation in a Point Spread Function due to an image height of said optical system is equal to or smaller than a predetermined degree so as not to affect the determination of the distance of the object by said distance determining unit;
wherein, in said optical system, an amount of field curvature |δq| in each of image heights satisfies an expression (2) where F denotes an F-number of said optical system, f denotes a focal length of said optical system, minD denotes the number of pixels indicating a smallest size of a determinable blur by said distance determining unit, $u_{max}$ denotes distance farthest from said optical system in the range of the distance of the object determined by said distance determining unit, and d denotes a size of one pixel in said imaging device:

$$|\delta q| < \frac{u_{max}}{u_{max} - f} F d \min D.$$

7. An image processing apparatus, comprising:
an imaging device which captures an image; an optical system which causes said imaging device to form an image of an object; and a distance determining unit configured to determine distance of the object between said optical system and the object based on a size of a blur developed on the image, wherein said optical system has a characteristic which simultaneously satisfies both of conditions that (i) variation in magnification is equal to or smaller than the predetermined number of pixels in the case where a focused point is set farthest from and closest to said optical system in a range of the distance of the object determined by said distance determining unit and (ii) variation in a Point Spread Function due to an image height of said optical system is equal to or smaller than a predetermined degree so as not to affect the determination of the distance of the object by said distance determining unit;
wherein, in said optical system, an amount of field curvature in a sagittal direction δqs and an amount of the field curvature in a tangential direction δqt in each of image heights respectively satisfy an expression (3) and an expression (4) where F denotes an F-number of said optical system, f denotes a focal length of said optical system, minD denotes the number of pixels indicating a smallest size of a determinable blur by said distance determining unit, $u_{max}$ denotes distance farthest from said optical system in the range of the distance of the object determined by said distance determining unit, and d denotes a size of one pixel in said imaging device:

$$|\delta qs| < \frac{u_{max}}{u_{max} - f} F d \min D \tag{3}$$

$$|\delta qt| < \frac{u_{max}}{u_{max} - f} F d \min D. \tag{4}$$

8. An image processing apparatus, comprising:
an imaging device which captures an image; an optical system which causes said imaging device to form an image of an object; and a distance determining unit configured to determine distance of the object between said optical system and the object based on a size of a blur developed on the image, wherein said optical system has a characteristic which simultaneously satisfies both of conditions that (i) variation in magnification is equal to or smaller than the predetermined number of pixels in the case where a focused point is set farthest from and closest to said optical system in a range of the distance of the object determined by said distance determining unit and (ii) variation in a Point Spread Function due to an image height of said optical system is equal to or smaller than a predetermined degree so as not to affect the determination of the distance of the object by said distance determining unit;
wherein, in said optical system, an amount of coma aberration δc in each of image heights satisfies an expression (5) where minD denotes the number of pixels indicating a smallest size of a determinable blur by said distance determining unit, and d denotes a size of one pixel in said imaging device: |δc|<dminD (5).

9. An image processing method which is carried out by an image processing apparatus including: an imaging device which captures an image; an optical system which causes the imaging device to form an object image; and a distance determining unit which determines distance of the object between the optical system and the object based on a size of a blur developed on the image, said method comprising determining the distance of the object by the distance determining unit based on the size of the blur developed on the image, wherein the optical system has a characteristic which simultaneously satisfies both of conditions that (i) variation in magnification is equal to or smaller than the predetermined number of pixels in the case where a focused point is set farthest from and closest to the optical system in a range of the distance of the object determined by the distance determining unit and (ii) variation in a Point Spread Function due to an image height of the optical system is equal to or smaller than a predetermined degree so as not to affect the determination of the distance of the object by the distance determining unit; and wherein the range of the distance is determined based on a same set of coordinates of the image at different focus points.

10. The apparatus according to claim 9, wherein the predetermined number of pixels comprises the smallest size of a determinable blur at the distance of the object.

11. The apparatus according to claim 9, wherein an amount of off-axis blur developed by a field curvature is smaller than a determinable degree in the distance determination.

12. The apparatus according to claim 9, wherein an amount of field curvature in a sagittal direction and an amount of the field curvature in a tangential direction at each focus is less than a predetermined threshold.

\* \* \* \* \*